(12) United States Patent
Nielsen et al.

(10) Patent No.: US 7,919,880 B2
(45) Date of Patent: Apr. 5, 2011

(54) METHOD FOR DAMPING TOWER OSCILLATIONS, AN ACTIVE STALL CONTROLLED WIND TURBINE AND USE HEREOF

(75) Inventors: Thomas Steiniche Bjertrup Nielsen, Randers (DK); Bo Juul Pedersen, Hadsten (DK); Christopher John Spruce, Surrey (GB)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/429,558

(22) Filed: Apr. 24, 2009

(65) Prior Publication Data

US 2009/0200804 A1    Aug. 13, 2009

Related U.S. Application Data

(63) Continuation of application No. PCT/DK2007/000427, filed on Oct. 4, 2007.

(51) Int. Cl.
*F03D 9/00* (2006.01)
*H02P 9/04* (2006.01)

(52) U.S. Cl. .......................................... 290/44; 290/55

(58) Field of Classification Search .................. 290/44, 290/55; 415/2.1, 4.2, 4.5, 4.1; 416/1, 30, 416/35, 132 B
See application file for complete search history.

(56) References Cited

U.S. PATENT DOCUMENTS

| 4,193,005 | A |   | 3/1980 | Kos et al. |       |
|-----------|---|---|--------|------------|-------|
| 4,435,647 | A | * | 3/1984 | Harner et al. | 290/44 |
| 6,441,507 | B1 | * | 8/2002 | Deering et al. | 290/44 |
| 6,525,518 | B1 | * | 2/2003 | Garnaes | 324/76.13 |
| 2008/0012346 | A1 | * | 1/2008 | Bertolotti | 290/55 |
| 2009/0185901 | A1 | * | 7/2009 | Nielsen et al. | 416/1 |
| 2009/0246020 | A1 | * | 10/2009 | Nielsen et al. | 416/1 |

FOREIGN PATENT DOCUMENTS

| DE | 10044262 A1 | * | 3/2002 |
| DE | 10044262 A1 |   | 3/2003 |
| EP | 0244341 B1 |   | 12/1990 |
| EP | 1008747 A2 |   | 6/2000 |
| EP | 1243790 B1 |   | 9/2002 |
| EP | 1269015 B1 |   | 1/2003 |
| FR | 2509046 A | * | 1/1983 |
| GB | 2117933 A |   | 10/1983 |
| JP | 08021128 A |   | 1/1996 |

(Continued)

OTHER PUBLICATIONS

Danish Patent Report, May 29, 2007 (1 page).
International Search Report, Feb. 25, 2008 (3 pages).

(Continued)

*Primary Examiner* — Julio Gonzalez
(74) *Attorney, Agent, or Firm* — St. Onge Steward Johnston & Reens, LLC

(57) ABSTRACT

The invention relates to a method for damping tower oscillations in the tower of an active stall controlled wind turbine. The method comprises the steps of operating two or more blades of the wind turbine in a stall condition, detecting if the tower oscillates beyond a predefined level, and establishing different stall conditions between at least two of the blades, wherein the different stall conditions are established by offsetting the pitch angle of at least a first blade in relation to the pitch angle of one further blade. The invention further relates to an active stall controlled wind turbine and use hereof.

16 Claims, 6 Drawing Sheets

FOREIGN PATENT DOCUMENTS

| | | | | |
|---|---|---|---|---|
| JP | 2003201952 | A | * | 7/2003 |
| JP | 20033201952 | A | | 7/2003 |
| WO | 9936695 | A1 | | 7/1999 |
| WO | 2004099608 | A1 | | 11/2004 |
| WO | 2006007838 | A1 | | 1/2006 |

OTHER PUBLICATIONS

International Preliminary Report on Patentability & Written Opinion of the International Searching Authority; PCT/DK2007/000427; Apr. 28, 2009; 8 pages.

* cited by examiner

METHOD FOR DAMPING TOWER OSCILLATIONS, AN ACTIVE STALL CONTROLLED WIND TURBINE AND USE HEREOF

CROSS-REFERENCE TO RELATED APPLICATIONS

The present application is a continuation of pending International patent application PCT/DK2007/000427 filed on Oct. 4, 2007 which designates the United States and claims priority from Danish patent application PA 2006 01382 filed on Oct. 24, 2006, the content of which is incorporated herein by reference.

FIELD OF THE INVENTION

The invention relates to a method for damping tower oscillations in the tower of an active stall controlled wind turbine, an active stall controlled wind turbine and use hereof

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated in FIG. 1.

Oscillations and vibrations of the wind turbine tower are a problem to a greater or lesser extent for all types of wind turbines but particularly within the art of making active stall controlled wind turbines this problem is profound.

Tower oscillations can e.g. arise from the fact that each time a rotor blade passes the tower, the wind will push slightly less against the tower. If the rotor turns with a rotational speed such that a rotor blade passes the tower each time the tower is in one of its extreme positions, then the rotor blade may either dampen or amplify the oscillations of the tower.

Other sources for tower oscillations are also possible but with active stall controlled wind turbines one source is dominant.

During normal operation of an active stall controlled wind turbine the rotor exhibit positive aerodynamic damping. The tower top is moving around substantially all the time although the movements are small. When the tower top moves upwind the rotor thrust increases, thereby the tower top is pushed back downwind, which dampens the tower vibrations. Similarly, when the tower top moves downwind the rotor thrust decreases thereby the tower top is pushed back upwind, which again dampens the tower vibrations.

But the rotor aerodynamics of an active stall controlled wind turbine is non-linear. On a thrust versus wind speed curve such a rotor will exhibit a relatively small region of negative slope, which results in that under certain conditions the rotor provides negative aerodynamic damping. When the tower top moves upwind the rotor thrust decreases, thereby the tower top is pushed further upwind, which amplifies the tower vibrations. Similarly, when the tower top moves downwind the rotor thrust increases, thereby the tower top is pushed further downwind, which again amplifies the tower vibrations.

In the worst case this negative aerodynamic damping can make the tower oscillate to a degree that the tower or other parts of the wind turbine is damaged, to a degree that the life of the tower or other parts are severely reduced or to a degree that the efficiency of the wind turbine is reduces.

One way of dealing with this problem is to take different measures during the design phase of the wind turbine e.g. by making the tower stiffer, by designing the blades differently, by reducing the weight of the nacelle and rotor or other. But these measures often collide with other desired qualities of the wind turbine, such as low production cost, high efficiency and other.

Another way is to simply shut down the wind turbine when critical tower oscillations is detected and then start up again, when the wind turbine is completely shut down or when certain critical conditions has changed—such as when the wind speed has changed. This method is under certain circumstances very effective in eliminating or damping the tower oscillations but it takes a long time to shut down and restart a wind turbine, hence the overall power output of the wind turbine is reduced. Furthermore, it increases the wear on many parts of the wind turbine to stop and start frequently, and to increase the life of the wind turbine stopping and starting should therefore be kept to a minimum.

Other ways of dealing with this problem has therefore been developed and one of these is disclosed in European patent application No EP 1 008 747 A2. This application discloses a way of damping tower movements by means of a dampened pendulum suspended in the tower. But these types of dampers have to be very large and heavy to dampen tower oscillations efficiently in a large modern wind turbine and they are both expensive, they add unwanted weight to the tower or to the nacelle—which the tower has to be designed to carry—and they take up space in the tower or in the nacelle.

An object of the invention is therefore to provide for a technique for damping or eliminating tower oscillations in the tower of an active stall controlled wind turbine, which do not present the mentioned disadvantages.

Particularly, it is an object of the invention to provide for a simple and cost-efficient technique for damping or eliminating tower oscillations in the tower of an active stall controlled wind turbine.

SUMMARY OF THE INVENTION

The invention provides for a method for damping tower oscillations in the tower of an active stall controlled wind turbine. The method comprises the steps of operating two or more blades of the wind turbine in a stall condition, detecting if the tower oscillates beyond a predefined level, and establishing different stall conditions between at least two of the blades, wherein said different stall conditions are established by offsetting the pitch angle of at least a first blade in relation to the pitch angle of one further blade.

Certain conditions have to be present for potentially damaging tower oscillations to occur in an active stall controlled wind turbine: the wind has to have a certain speed, the coherence of the wind across the wind turbines rotor has to be high, the wind turbine and particularly the blades have to have a certain design, the blades have to be placed at a certain pitch angle and other. Most of these conditions cannot be controlled or cannot be controlled without somehow reducing the wind turbines efficiency or making the wind turbine more expensive.

But by establishing different stall conditions between at least two of said blades, simple and efficient means are provided for reducing the coherence of the wind as seen by the wind turbine rotor, hereby damping or eliminating the tower oscillations.

It should be emphasised that by the term "establishing different stall conditions between at least two of the blades" is to be understood, that the stall conditions of at least one blade is established differently than the stall conditions of at least one other blade of the wind turbine rotor.

Active stall controlled wind turbines are by their nature provided with the ability to change the pitch angle of the blades and thereby adjust the blades angle of attack, to control the power output of the rotor or the wind turbine and to protect the blades or the wind turbine from damaging overloads.

The ability to pitch the wind turbine blades is therefore already present in modern active stall controlled wind turbines and by using this ability to alter at least one of the conditions needed for damaging tower oscillations to occur or at least for tower oscillations to build up, is advantageous, in that simple and cost-efficient means hereby is provided for damping or eliminating these oscillations.

It should be emphasised that this offsetting of the pitch angles is relative—meaning that it is an extra change of the pitch angle aside from the pitch angle change being performed to optimise the blades angle to the incoming wind in relation to power output, load, noise or other.

In an aspect of the invention, said different stall conditions establish an asymmetric load situation on the rotor of said wind turbine.

By establishing an asymmetric load situation on the rotor the rotors ability to induce tower oscillations is reduced. This is advantageous in that the risk of the energy of the wind being converted to oscillations of the tower is hereby reduced.

In an aspect of the invention, the sum of the thrust provided by said blades are being substantially maintained when establishing said different stall conditions between at least two of said blades.

At some sites around the world, the wind can be very homogeneous, with the result that if the wind conditions for potentially damaging tower oscillations to occur are present, tower oscillations will build up constantly. It is therefore advantageous that the rotor thrust is substantially maintained, when carrying out a method for damping or eliminating these oscillations in that it hereby is possible to substantially maintain the wind turbines total power output even though tower oscillations is dampened.

In an aspect of the invention, said difference in stall conditions is established permanently for as long as the size of said tower oscillations is within a predefined range.

The difference in stall conditions could be established e.g. by constantly swinging the nacelle and thereby the rotor back and forth in relation to the wind direction. But this constant motion would wear the wind turbine or different parts of the wind turbine and under certain conditions there is also a risk of these e.g. cyclic motions would further induce the tower oscillations instead of damping them.

It is therefore advantageous to maintain the difference in stall conditions constantly as long as the tower oscillations are within a predefined range.

In an aspect of the invention, said different stall conditions are established by offsetting the pitch angle of at least a first blade in a first direction and offsetting the pitch angle of at least one further blade in the opposite direction of said first direction.

By offsetting at least on blade positive and offsetting at least one further blade negative, the power output of one blade is increased and the power output of another blade is reduced, hence the overall power output of the rotor is substantially maintained.

In an aspect of the invention, said offset of said pitch angles are maintained substantially unchanged as long as the size of said tower oscillations are within a predefined range.

Hereby is achieved an advantageous embodiment of the invention.

In an aspect of the invention, said difference in stall conditions is substantially removed, when the size of said tower oscillations has dropped below a predefined level.

Difference in stall conditions will under most circumstances not provide for the most optimal conditions regarding efficiency, wear and other. It is therefore advantageous that the normal stall conditions are re-established as soon as the tower oscillations have dropped below a predefined level.

In an aspect of the invention, said method further comprise the step of reducing the power output of the rotor if said tower oscillates beyond a further predefined level.

If the oscillations are so powerful that—even though difference in stall conditions are established—they continue to rise beyond a further predefined level, it is advantageous to reducing the power output of the rotor, in that hereby the chance of the oscillations being dampened is further increased.

In an aspect of the invention, said method further comprises the step of substantially removing said different stall conditions and moving the substantially uniform pitch angles to between −1° and −30°, preferably between −4° and −20° and most preferred between −8° and −16°, such as −12°, if said tower oscillates beyond a second predefined level.

If the tower oscillations do not drop below an acceptable level within a predefined time or if the size of the tower oscillations grow beyond a second predefined level, even though different stall conditions has been established, it is advantageous to re-establish a normal uniform pitch situation and offset the pitch angle of all the blades, making the blades turn into the wind and thereby discard almost all the energy of the wind, to ensure that this energy is not converted into tower oscillations. Hereby it is ensured that the risk of the potentially damaging tower oscillations continuing is further reduced and even though this will momentarily reduce the power production of the wind turbine to a low or zero level, it is still much faster and fare less strenuous for the wind turbine compared to shutting the entire wind turbine down and restarting it.

Furthermore, if the pitch angle of the blades are offset too little—when tower oscillations above a second level are detected—the oscillations might not be dampened or it takes a relative long time and if the blades are pitched too much the risk of the rotor going to negative is increased, hereby increasing the risk of the wind turbine having to be shut down because the connection to the utility grid can not be maintained—e.g. to protect the gearbox from rotor backlash and other.

The present ranges for the pitch angles—when tower oscillations above a predefined second level are detected—therefore presents an advantageous relation between damping efficiency and overall power output.

In an aspect of the invention, said different stall conditions between at least two of said blades are established by positioning the rotor plane at an angle different from the perpendicular to the direction of the wind.

Active stall controlled wind turbines are substantially always provided with a yawing mechanism which enables the rotor plane to be aligned perpendicular to the direction of the wind. By controlling the yaw error to a non-zero value it is possible to establish different stall conditions between the blades in a simple and efficient manner.

In an aspect of the invention, said tower oscillations are detected by use of detection means in the form of one or more oscillation sensors placed in a nacelle of said wind turbine.

The tower is fixed at the foundation, so the higher one moves up the tower, the larger the amplitude when the tower oscillates. The nacelle is positioned on top of the tower and the amplitude of the nacelle oscillations will therefore be even bigger than the amplitude at the top of the tower and it is therefore advantageous to place the oscillation sensors in the nacelle.

Furthermore, this position will in most cases also simplify the cable running, in that typically the general control of the wind turbine or the tower oscillation specific control means (to which the oscillation sensors have to be connected) is placed in the nacelle. Hereby difficult cable runnings across the rotating joint between the tower and the nacelle is avoided.

In an aspect of the invention, said oscillation sensors are one or more accelerometers, in that accelerometers are a simple and cost-efficient means for detecting oscillations.

In an aspect of the invention, said method further comprise the step of giving of an alarm signal if the size of said tower oscillations rises beyond a further predefined level or if said oscillations has not dropped below a predefined level within a predefined period of time.

If the size of the tower oscillations has not dropped below a predefined level within a predefined period of time or if the oscillations rises beyond a further predefined level, something could be wrong with the detection system or the risk of the blades, the tower or other parts being damaged is increased and it is therefore advantageous to make the control means give an alarm. This alarm signal could then trigger a shut down of the wind turbine and/or it could be transferred to a surveillance centre or other that could evaluate the situation and take the necessary actions.

Further, the invention provides for an active stall controlled wind turbine comprising control means for carrying out a method according to any of claim 1 to 14.

Hereby is achieved an advantageous embodiment of an active stall controlled wind turbine.

Even further, the invention provides for use of an active stall controlled wind turbine according to claim 15 in a wind turbine park comprising at least two active stall controlled wind turbines.

If the coherence of the wind is high across the rotor of one wind turbine in a wind turbine park, there is a high probability that the coherence of the wind also is high across the other wind turbines in the park. If many wind turbines in a park are shut down substantially simultaneously it is particularly critical because it is difficult for the power company to compensate for this sudden large loss in power, and it is therefore particularly advantageous to use an active stall controlled wind turbine according to the invention in a wind turbine park, in that an active stall controlled wind turbine according to the invention much more often will maintain the power production and even if it occasionally has to shut down—to prevent tower oscillations from damaging the wind turbine—the risk of several wind turbine according to the invention in the same wind turbine park shutting down simultaneously is greatly reduced.

BRIEF DESCRIPTION OF THE DRAWINGS

The invention will be described in the following with reference to the figures in which.

DETAILED DESCRIPTION OF THE INVENTION

Figure 1:
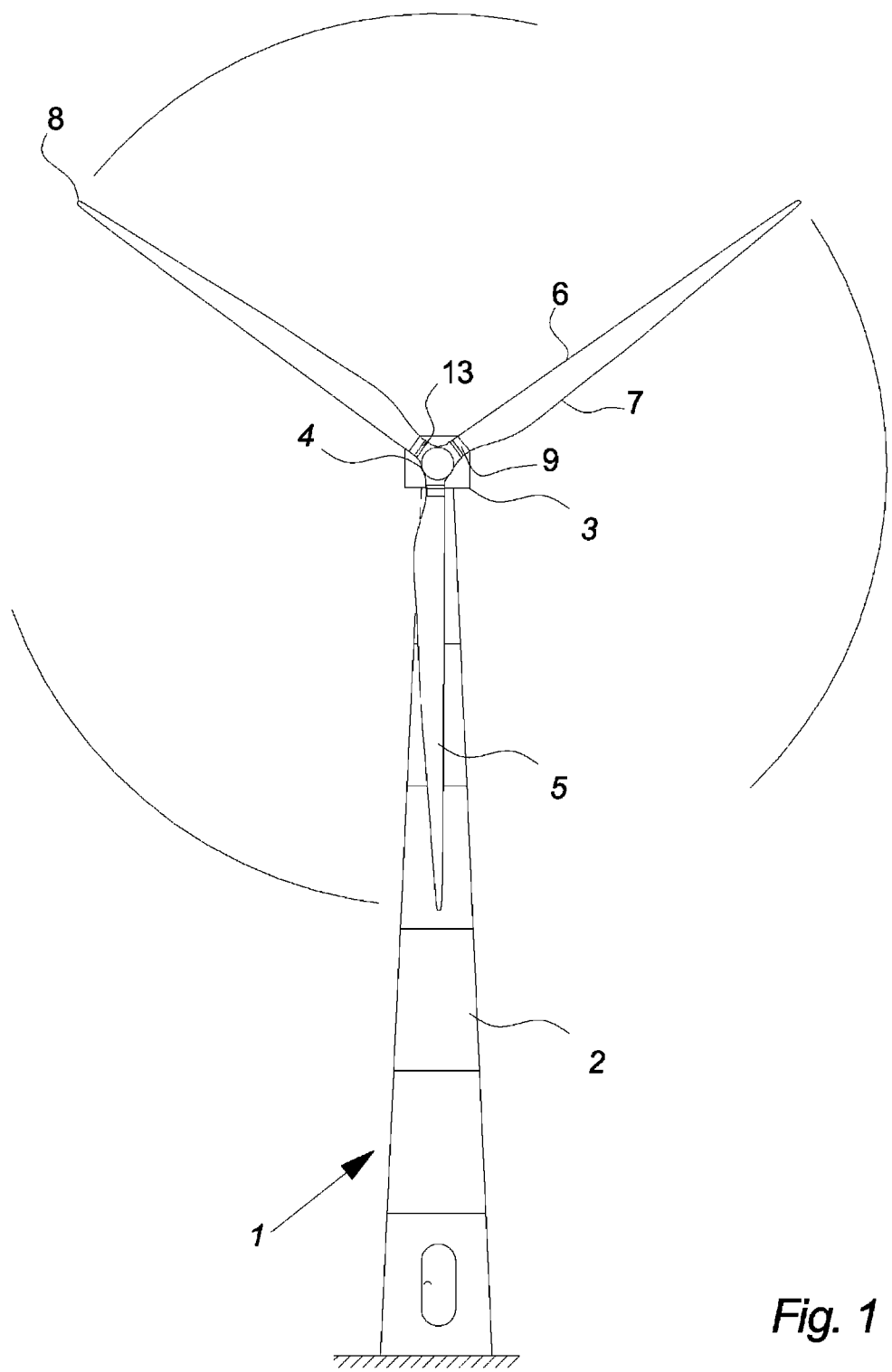
FIG. 1 illustrates a large modern active stall controlled wind turbine known in the art, as seen from the front.

FIG. 1 illustrates a modern active stall controlled wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Each of the blades 5 comprise a tip 8 and a root 9 and at the root 9 each of the blades 5 is provided with a pitch mechanism 13, enabling that the blades 5 can be rotated around their longitudinal axis.

Figure 2:
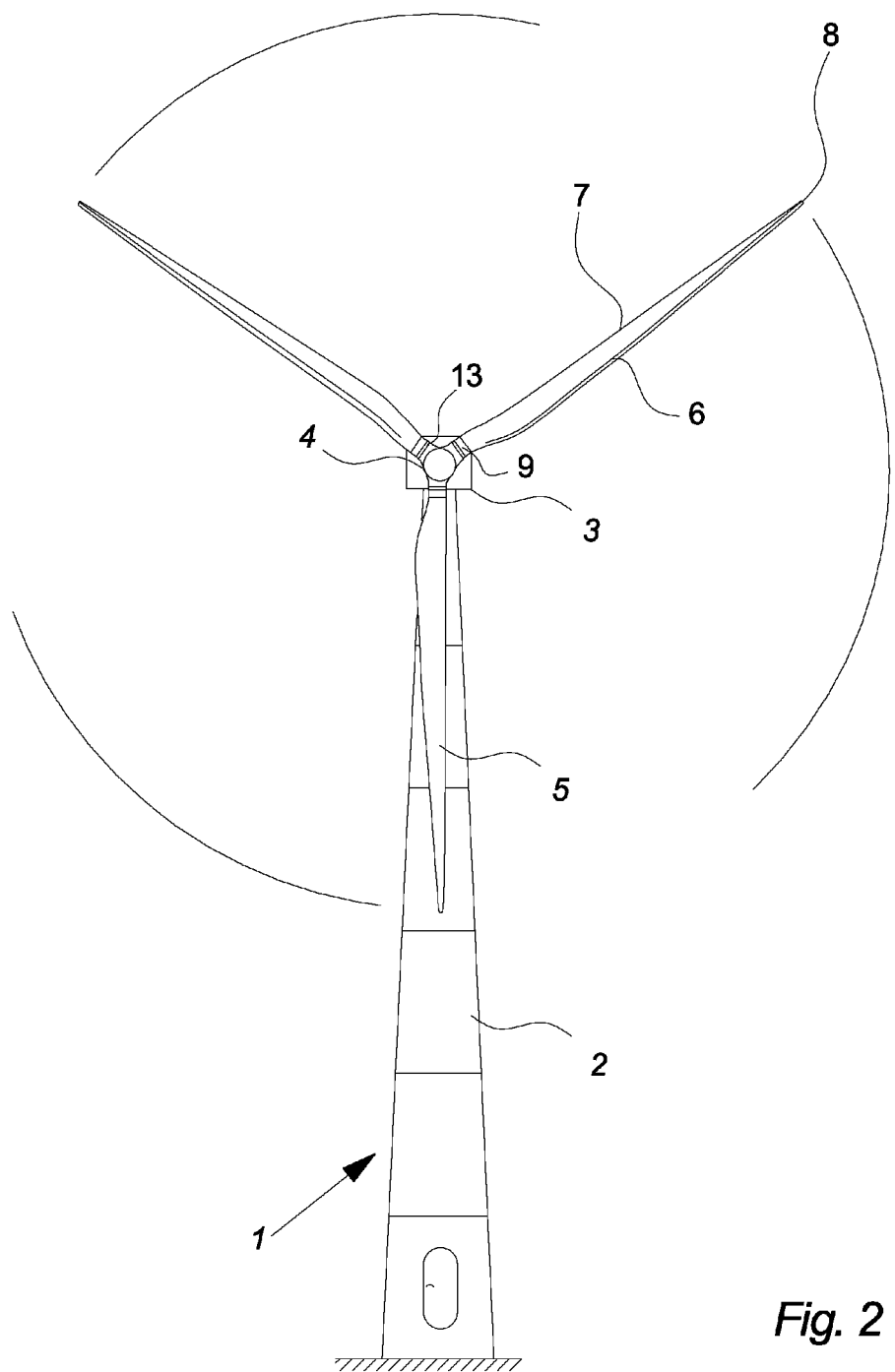
FIG. 2 illustrates an active stall controlled wind turbine comprising blades in different pitch angles, as seen from the front.

FIG. 2 illustrates an active stall controlled wind turbine 1 comprising three blades 5 each positioned in a pitch angle different from the pitch angle of the two other blades 5, as seen from the front.

When certain wind conditions are present—such as the wind speed being within a specific narrow range, the wind being low turbulent and/or the coherence of the wind across the wind turbine rotor 4 being high—negative aerodynamic damping can occur, hereby causing critical oscillations in the wind turbine tower 2.

If the size of the tower oscillations is above a certain predefined level, according to the invention different stall conditions can be established for the rotor blades 5, to eliminate this negative aerodynamic damping.

In this embodiment of the invention this is done by not offsetting the pitch angle of the first blade 5, offsetting the pitch angle of the second blade +2° and offsetting the pitch angle of the third blade −2°. Hereby the conditions under which negative aerodynamic damping can occur has been disrupted—in that the effective coherence of the wind across the wind turbine rotor 4 has been reduced—and thereby the tower oscillations has been dampened or eliminated.

In another embodiment of the invention the order in which the blades 5 are pitched could be different such as not offsetting the pitch angle of the first blade 5, offsetting the pitch angle of the second blade −2° and offsetting the pitch angle of the third blade +2° or other.

If this does not dampen the tower oscillations to an acceptable level or if the size of the oscillations increases above a second level, the power output of the wind turbine 1 could be reduced to close to zero kilo-Watt while maintaining the wind turbines 1 connection to the utility grid, which therefore maintains the rotor 4 rotating at power production speed (which in this case is approximately 14.4 RPM). This could e.g. be done by returning all the blades 5 to their collective pitch demand in form of their normal substantially equal pitch angle and then this substantially uniform pitch angle could be moved to between −1° and −30°, preferably between −4° and −20° and most preferred between −8° and −16°, such as −12° as in this embodiment. As soon as the detection means 21—detecting the size of the tower oscillations—detects that the tower oscillations has dropped beneath a predefined level or after a predefined time the blades 5 can be returned to their normal production pitch angle i.e. pitched positive back to a normal operation pitch angle of e.g. −4° and the wind turbine 1 can return to normal operating mode.

In another embodiment the control means 25 of the wind turbine 1 could also be provided with further predefined levels between the described first and second level, e.g. enabling that if the size of the tower oscillations did not drop when the pitch angle of the three blades where offset −2°, +2° and 0° and the size of the oscillations continued to grow hereby passing said further level (said further predefined level being lower than the second predefined level) the offset of the pitch angles would be increased e.g. to 0°, +4° and −4°, hereby further reducing the apparent coherence of the wind across the wind turbine rotor 4.

By creating such a heterogeneous pitch angle situation—when tower oscillations above a certain predefined level is detected—it is possible to substantially maintain the overall power output of the rotor 4, in that the power output of a first blade 5 is unchanged, the power output of a second blade 5 is slightly increased and the power output of a third blade 5 is slightly reduced.

In another embodiment of the invention the pitch angle of only one blade 5 is offset, leaving the pitch angle of the remaining blades 5 unchanged during the attempt to dampen or eliminate tower oscillations.

In this embodiment of the invention the active stall controlled wind turbine 1 comprise three blades 5 but in another embodiment the wind turbine 1 could comprise another number of blades such as two, four or more.

If the wind turbine 1 only comprised two blades 5 only the pitch angle of one of the blades 5 could be offset to reduce the coherence of the wind across the rotor 4 or both blades 5 could be offset in opposite directions.

If the wind turbine 1 comprised four or more blades the different stall conditions between the blades 5 could be enabled e.g. by pairing the blades 5 and then offsetting the pitch angles of these pairs in different directions or e.g. by offsetting the blades' pitch angles in opposite directions alternately or otherwise.

Figure 3:
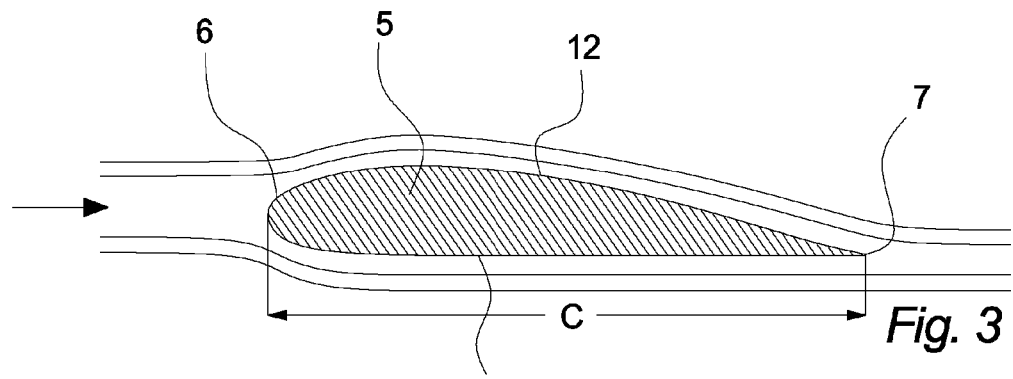
FIG. 3 illustrates a cross-section of a wind turbine blade in a non-stall condition, as seen from the root of the blade.

FIG. 3 illustrates a cross-section of a wind turbine blade 5 of an active stall regulated wind turbine 1 in a non-stall condition, as seen from the root 9 of the blade 5.

Figure 4:
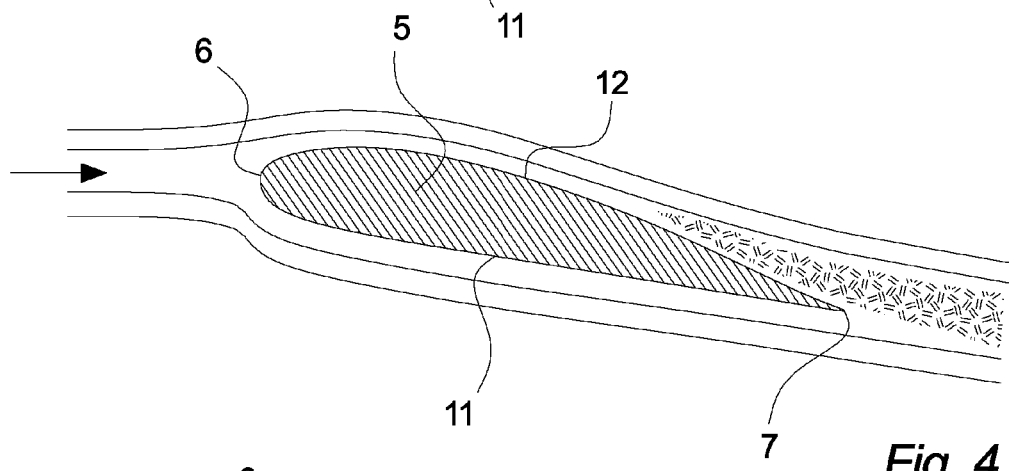
FIG. 4 illustrates a cross-section of a wind turbine blade in a stall condition, as seen from the root of the blade.
Figure 5:
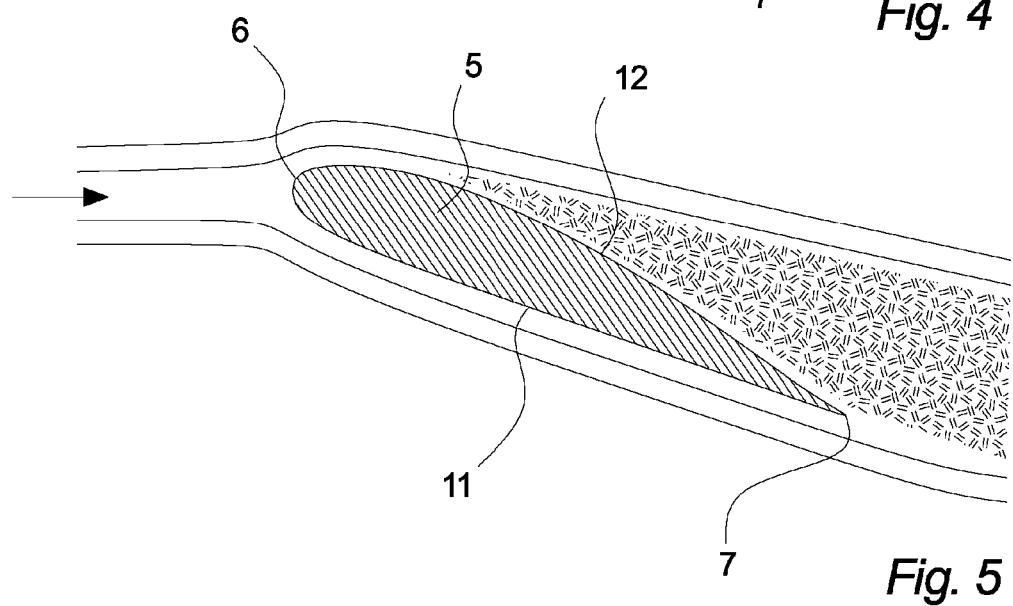
FIG. 5 illustrates a cross-section of a wind turbine blade in a deep stall condition, as seen from the root of the blade.

The wind turbine blade 5 of an active stall controlled wind turbine 1 comprises a leading edge 6, a trailing edge 7, a pressure side 11 and a leeward side 12 and the arrow on the FIGS. 3 to 5 illustrate the relative wind direction as seen from the rotating blade 5 and therefore not the wind direction as seen by the rotor plane 4 or the wind turbine 1.

A wind turbine blade 5 known in the art is typically made of a glass fibre and resin composite reinforced by carbon fibre, carbon fibre reinforced wood or a combination hereof.

In this embodiment the illustrated blade 5 of an active stall regulated wind turbine 1, is operating in low wind or during start up before the blade 5 starts to stall. The illustrated blade is operating at an absolute pitch angle of 0° in that the blades angle off attack is 0° given that the direction of the incoming wind is parallel with the chord C of the blade 5 as seen from the blade 5.

In another embodiment FIG. 3 could also illustrate a blade 5, where the pitch angle was offset by e.g. +4°, from a normal operation pitch angle of approximately −4°, as under conditions of tower oscillations above a certain level according to the invention.

FIG. 4 illustrates a cross-section of a wind turbine blade 5 of an active stall regulated wind turbine 1 during normal operation, as seen from the root 9 of the blade 5.

On a pitch controlled wind turbine (not shown) the turbines electronic controller checks the rotational speed or the power output of the turbine e.g. several times per second. When the power output or the rotational speed becomes too high, the controller sends a command to the blade pitch mechanism 13, which immediately pitches (turns) the rotor blades 5 slightly out of the wind (which is the opposite direction than on an active stall controlled wind turbine 1). Likewise, the blades 5 are turned back into the wind whenever the wind drops again.

On the pitch controlled wind turbine (not shown), the controller will generally pitch the blades 5 slightly every time the wind changes in order to keep the rotor blades 5 at the optimum angle in order to maximise output for all wind speeds or at least up to a certain wind speed such as 25 meters/sec., where the blades 5 are turned completely out of the wind—making the blade chord C (the line between the trailing edge 7 and the leading edge 6) substantially parallel with the wind direction (as seen by the wind turbine), making the leading edge of the blades 5 substantially face upwind and making the rotor 4 stop rotating or at least making it idle. Doing this protects the blades 5 from damaging overload at high wind speeds and because the loads on the blade 5 of an pitch controlled wind turbine is different than on an active stall regulated wind turbine 1 the blade 5 of a pitch controlled wind turbine 1 can be made relative long and slender, compared to blade 5 of an active stall regulated wind turbine 1.

Technically an active stall controlled wind turbine 1 resembles a pitch controlled wind turbine 1, in that they both have pitchable blades, and in order to get a reasonably large torque (turning force) at low wind speeds, the active stall controlled wind turbine 1 will usually be programmed to pitch the blades 5 much like a pitch controlled wind turbine (not shown) at low wind speeds. When the active stall controlled wind turbine 1 reaches its rated power, however, one will notice an important difference from the pitch controlled wind turbines: As the power increases above nominal power, the active stall controlled wind turbine 1 will pitch its blades 5 in the opposite direction to that of a pitch controlled wind turbine 1. In other words, it will increase the angle of attack of the rotor blades 5 in order to make the blades 5 go into a deeper stall, thus discarding the excess energy in the wind. At high wind speeds the blades 5 of an active stall controlled wind turbine 1 will also have to be able to withstand a higher extreme load than blades 5 of a pitch controlled wind turbine 1, both just to keep the blades 5 from breaking and to keep the blades 5 from bending so much that there is a risk of them hitting the tower 2. The blades 5 of an active stall controlled wind turbine 1 are therefore made more rugged and heavy than blades 5 of a pitch controlled wind turbine 1.

Furthermore, stall creates noise and to reduce the noise emission from the active stall controlled wind turbine 1 the rotor 4 rotates slower than the rotor 4 of a pitch controlled wind turbine 1. The blades 5 of an active stall controlled wind turbine 1 therefore have to be bigger and wider to be able to utilize the energy of the wind efficiently.

FIG. 5 illustrates a cross-section of a wind turbine blade 5 in a deep stall condition, as seen from the root 9 of the blade 5.

The blade 5 illustrated in FIG. 5 is e.g. a blade 5 shown during operation at very high wind speeds, where the blade 5 is pitched into the wind making it stall and substantially lose all the energy of the wind.

In another embodiment of the invention FIG. 5 could also illustrate one of three blades 5 of an active stall regulated wind turbine 1, where the pitch angle is offset −4° to reduce the apparent coherence of the wind over the rotor 4, in that the pitch angle of the other two blades 5 would be offset +4° and unchanged respectively. Hereby an inhomogeneous load situation is established without substantially reducing the rotor thrust.

Figure 6:
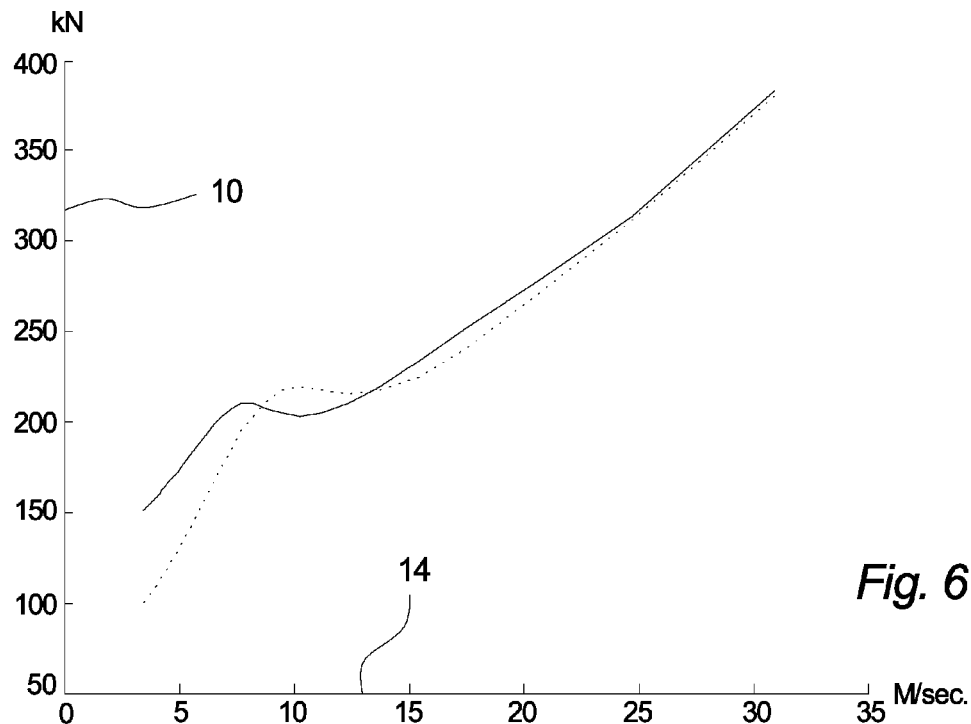
FIG. 6 illustrates an embodiment of a thrust versus wind speed curve at two different pitch angles.

FIG. 6 illustrates an embodiment of a static curve of thrust versus wind speed at two different pitch angles.

In this embodiment the axis of the ordinate 10 illustrates the thrust in kilo-Newton and the axis of the abscissa 14 illustrates the wind speed in meters per second.

The dotted curve shows the relation between trust and wind speed for a blade 5 at a pitch angle of −6° and the solid curve shows the relation between thrust and wind speed for a blade 5 at a pitch angle of −13°.

The graph shows that the static curves of thrust against wind-speed for an active stall controlled wind turbine 1 have a small region of negative slope in which the rotor aerodynamics are non-linear.

Figure 7:
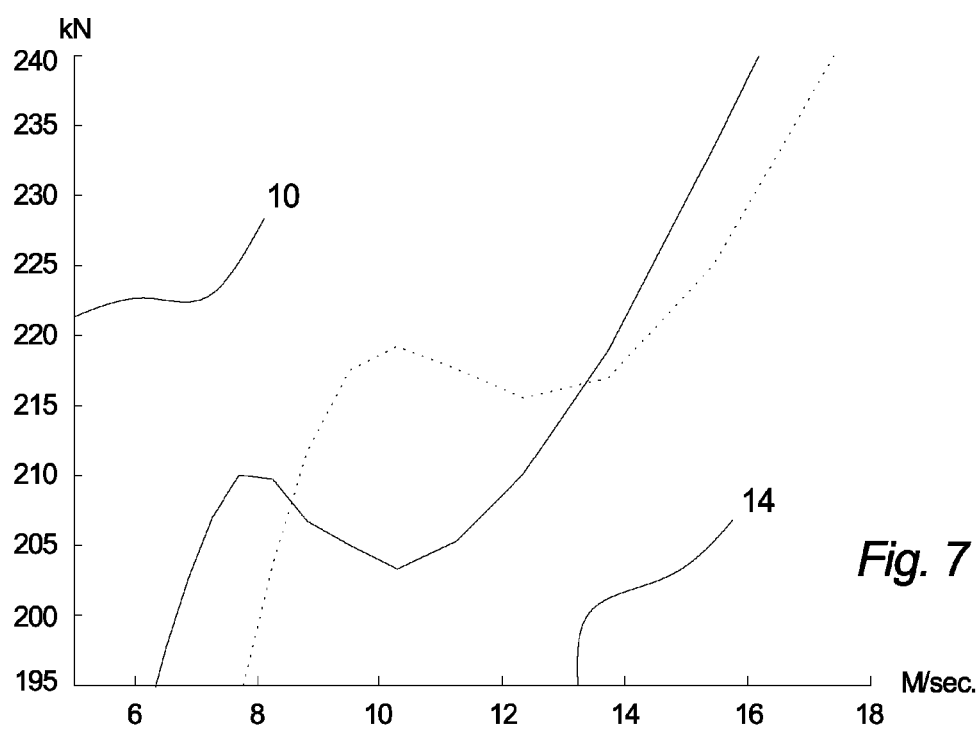
FIG. 7 illustrates a close-up of the same curves as illustrated in FIG. 6 around the region of negative slope.

FIG. 7 illustrates a close-up of the same curves as illustrated in FIG. 6 around the region of negative slope.

In this close-up it is particularly pronounced that under certain conditions the rotor 4 of an active stall controlled wind turbine 1 will provide negative aerodynamic damping. If these conditions are present for a long enough period of time or if these conditions are reoccurring often enough, potentially damaging tower oscillations can build up to a degree that measures have to be taken to not damage the tower 2 or other parts of the wind turbine 1.

Figure 8:
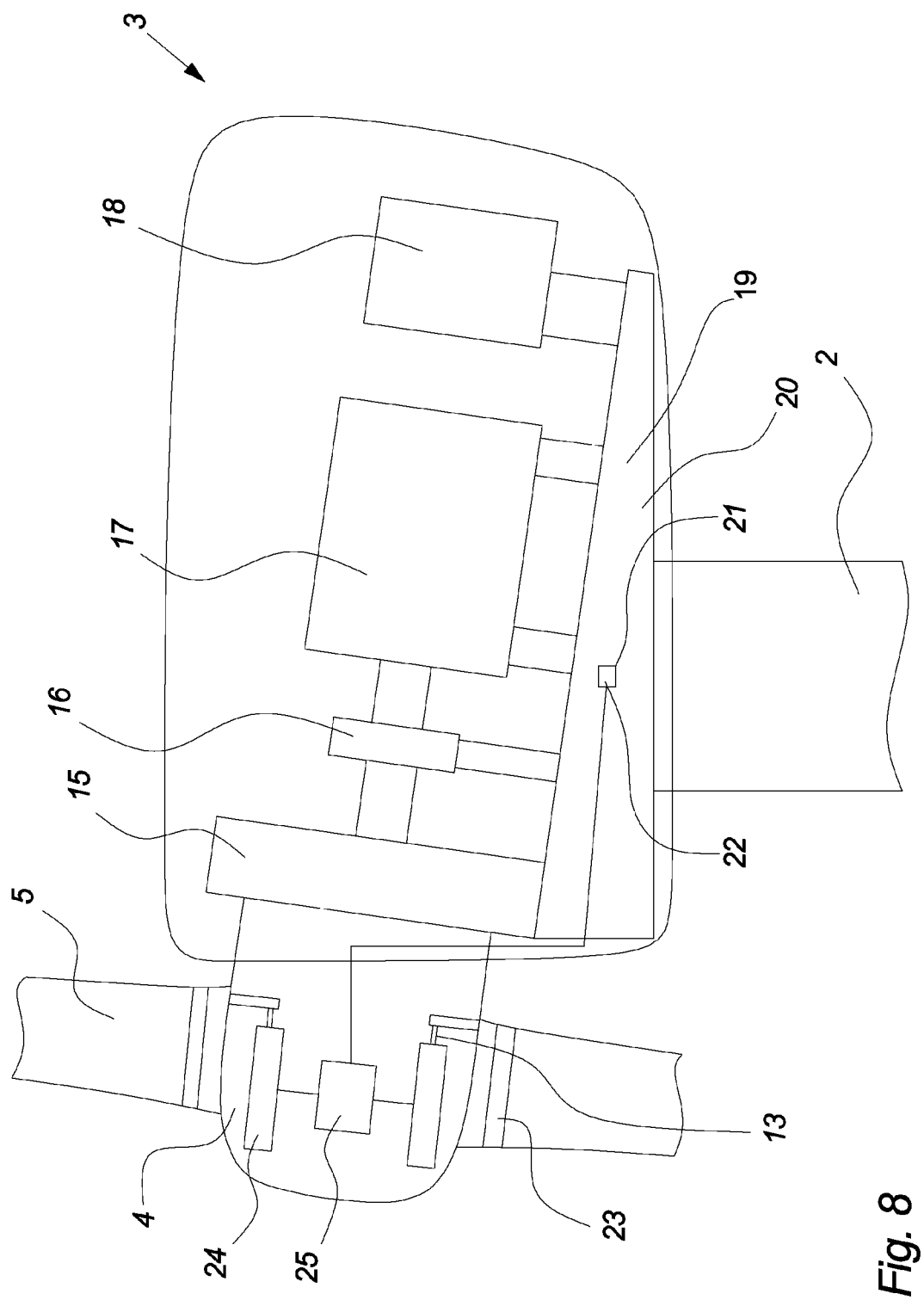
FIG. 8 illustrates a simplified cross section of a nacelle, as seen from the side.

FIG. 8 illustrates a simplified cross section of a nacelle 3 of an active stall regulated wind turbine 1, as seen from the side. Nacelles 3 exist in a multitude of variations and configurations but in most cases the drive train in the nacelle 3 comprises one or more of the following components: a gearbox 15, a coupling (not shown), some sort of braking system 16 and a generator 17. A nacelle 3 of a modern wind turbine 1 can also include a transformer 18 and additional peripheral equipment such as further power handling equipment, control cabinets, hydraulic systems, cooling systems and more.

The weight of the entire nacelle 3 including the nacelle components 15, 16, 17, 18 is carried by a strengthening structure 19. The components 15, 16, 17, 18 are usually placed on and/or connected to this common load carrying structure 19. In this simplified embodiment the strengthening structure 19 only extends along the bottom of the nacelle 3 e.g. in form of a bed plate 20 to which some or all the components 15, 16, 17, 18 are connected. In another embodiment the strengthening structure 19 could comprise a gear bell transferring the load of the rotor 4 to the tower 2, or the load carrying structure 19 could comprise several interconnected parts such as latticework.

In this embodiment of the invention the drive train is built at an angle to a horizontal plane. The drive train is, among other reasons, angled to enable that the rotor 4 can be angled correspondingly e.g. to ensure that the blades 5 do not hit the tower 2, to compensate for the differences in wind speed at the top and bottom of the rotor 4 and other.

In this embodiment of the invention detection means 21 is placed in the nacelle 3, in the form of two accelerometers 22 attached to the bed frame 20 just above the centre axis of the tower 2. In this embodiment the two accelerometers 22 are mounted in such a way that both transverse and fore-aft oscillations of the tower 2 are detected.

In another embodiment of the invention the detection means 21 could be other types of sensors than accelerometers 22—such as strain-gauges or optical fibres placed on the tower 2 or other, or the detection means 21 could be placed differently in the nacelle 3 or the detection means 21 could be placed outside the nacelle 3 such as in the tower 2 or outside the tower 2.

The detection means 21 is in this embodiment of the invention connected to control means 25. If oscillations of the tower 2 are detected or if oscillations of the tower 2 above a certain level are detected, the control means 25 can initiate that the blades 5 are pitched.

As previously explained the blades 5 of an active stall regulated wind turbine 1 are provided with a pitch mechanism 13. In the illustrated embodiment the blades 5 of the wind turbine 1 are connected to the hub through pitch bearings 23, enabling that the blades 5 can rotate around their longitudinal axis.

In this embodiment the pitch mechanism 13 comprise means for rotating the blades in the form of linear actuators 24 connected to the hub and the respective blades 5. In a preferred embodiment the linear actuators 24 are hydraulic cylinders. In another embodiment the pitch mechanism 13 could comprise stepper motors or other means for rotating the blades 5.

In this embodiment the control means 25 is placed in the hub but in a more preferred embodiment the control means 25 would be placed in the nacelle 3, in the tower 2, in a neighboring house or elsewhere e.g. at the same location as the general pitch control means (not shown) for the controlling the pitch in relation to load or power or even integrated in these general pitch control means.

In this embodiment the control means 25 are connected to the linear actuators 24 for controlling the pitch angle of the blades 5 in response to the measurements of the detection means 21.

If the size of the tower oscillations at the towers first natural frequency—detected by the accelerometers 22 in the nacelle 3—is above a certain level such as 0.5 meters/sec$^2$, the control means 25 provides a signal ensuring that the pitch angle of one of the blades 5 is offset e.g. +2°, the pitch angle of another blade 5 is offset e.g. −2° and the pitch angle of the last blade 5 is unchanged.

If the size of the tower oscillations—detected by the accelerometers 22 in the nacelle 3—increases to above a certain further level such as 0.75 meters/sec$^2$, the control means 25 provides a signal ensuring that the pitch angle of one of the blades 5 is offset e.g. +4°, the pitch angle of another blade 5 is offset e.g. −4° and the pitch angle of the last blade 5 is unchanged.

In another embodiment of the invention the pitch angles of the blades 5 could also be adjusted stepless in relation to the size of the tower oscillations.

If the size of the tower oscillations continues to rise and comes above a certain second level such as 1.0 meters/sec$^2$, the control means 25 provides a signal ensuring that the pitch angle of all the blades are changed to −12°.

In this embodiment of the invention the blades 5 are returned to their original or substantially to their original position, when the detection means 21 detects that the size of the oscillations has dropped below a certain predefined level again.

If the tower oscillations are not dampened sufficiently and have dropped below a predetermined level within a predetermined period of time the control means 25 could send of an alarm. Likewise, if the tower oscillations continues to grow in size—even though the control means 25 has sent a signal to pitch all the blades 5 e.g. −12°—an alarm signal could be sent.

Figure 9:
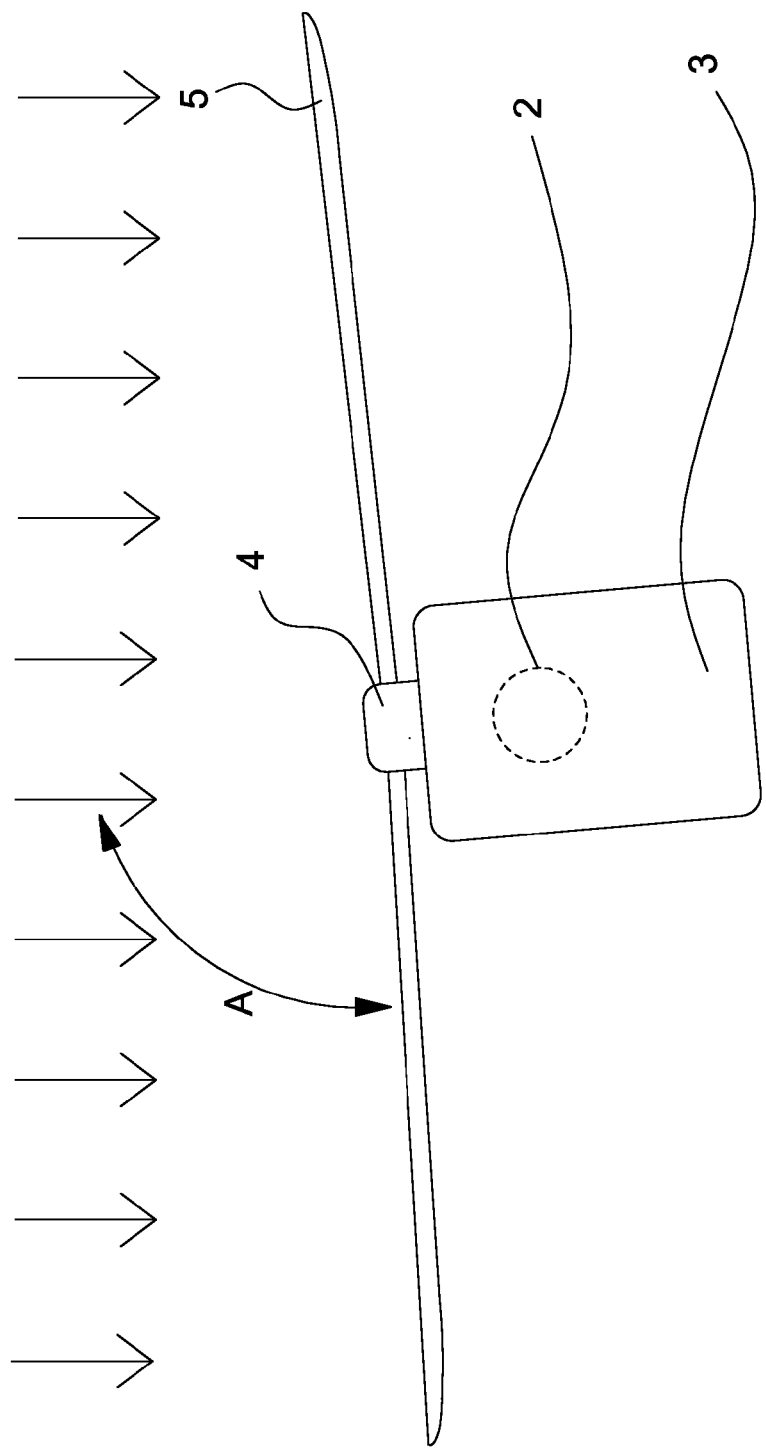
FIG. 9 illustrates an active stall controlled wind turbine, as seen from the top.

FIG. 9 illustrates an active stall controlled wind turbine 1, as seen from the top.

The arrows on FIG. 9 illustrate the relative wind direction as seen by the rotor plane 4 or the wind turbine 1.

In this embodiment of the invention the different stall conditions between at least two of rotor blades 5 is established by turning the entire nacelle 3 including rotor 4 slightly out of the wind, hereby creating a non-uniform load situation and thereby reducing the apparent coherence of the wind over the rotor 4. The displacement of the angle A between the rotor 4 and the incoming wind could then be controlled in relation to measurements of the size of the tower oscillations—either in steps (the nacelle 3 is turned X degrees if the size of the tower oscillations is above a predefined level Y) or adjusted continuously (stepless).

The invention has been exemplified above with reference to specific examples of wind turbines 1, detection means 21, methods for damping tower oscillations and other. However, it should be understood that the invention is not limited to the particular examples described above but may be designed and altered in a multitude of varieties within the scope of the invention as specified in the claims.

The invention claimed is:

1. A method for damping tower oscillations in a tower of an active stall controlled wind turbine, said method comprising the steps of
    operating two or more blades of said wind turbine in a stall condition,
    detecting if said tower oscillates beyond a predefined level, and
    establishing different stall conditions between at least two of said blades,
    wherein said different stall conditions are established by offsetting a pitch angle of at least a first blade in a first direction and offsetting a pitch angle of at least one further blade in an opposite direction of said first direction.

2. The method according to claim 1, wherein said different stall conditions establish an asymmetric load situation on a rotor of said wind turbine.

3. The method according to claim 1, wherein a sum of a thrust provided by said blades are being substantially maintained when establishing said different stall conditions between at least two of said blades.

4. The method according to claim 1, wherein said difference in stall conditions is established continuously as long as a size of said tower oscillations is within a predefined range.

5. The method according to claim 1, wherein said offset of said pitch angles are maintained substantially unchanged as long as a size of said tower oscillations is within a predefined range.

6. The method according to claim 1, wherein said difference in stall conditions is substantially removed, when a size of said tower oscillations has dropped below a predefined level.

7. The method according to claim 1, wherein said method further comprise the step of reducing a power output of a rotor if said tower oscillates beyond a further predefined level.

8. The method according to claim 7, wherein said power output is reduced by substantially removing said different stall conditions and moving substantially uniform pitch angles to between −1° and −30°.

9. The method according to claim 1, wherein said different stall conditions between at least two of said blades are established by positioning a rotor plane at an angle different from perpendicular to a wind direction.

10. The method according to claim 1, wherein said tower oscillations are detected by use of detection means in the form of one or more oscillation sensors placed in a nacelle of said wind turbine.

11. The method according to claim 10, wherein said oscillation sensors are one or more accelerometers.

12. The method according to claim 1, wherein said method further comprise the step of giving of an alarm signal if a size of said tower oscillations rises beyond a further predefined level or if said oscillations has not dropped below a predefined level within a predefined period of time.

13. An active stall controlled wind turbine comprising control means for carrying out a method according to claim 1.

14. The active stall controlled wind turbine according to claim 13 in a wind turbine park comprising at least two active stall controlled wind turbines.

15. The method according to claim 8, wherein said power output is reduced by substantially removing said different stall conditions and moving substantially uniform pitch angles to between −4° and −20°.

16. The method according to claim 15, wherein said power output is reduced by substantially removing said different stall conditions and moving substantially uniform pitch angles to between −8° and −16°.

* * * * *

UNITED STATES PATENT AND TRADEMARK OFFICE
CERTIFICATE OF CORRECTION

| | | |
|---|---|---|
| PATENT NO. | : 7,919,880 B2 | Page 1 of 3 |
| APPLICATION NO. | : 12/429558 | |
| DATED | : April 5, 2011 | |
| INVENTOR(S) | : Thomas Steiniche B. Nielsen et al. | |

It is certified that error appears in the above-identified patent and that said Letters Patent is hereby corrected as shown below:

At column 1, line approx. 53, "is non-linear" should read -- are non-linear --.

At column 1, line approx. 65, "turbine is" should read -- turbine are --.

At column 1, line approx. 66, "are severely" should read -- is severely --.

At column 1, line approx. 67, "is reduces" should read -- is reduced --.

At column 2, line approx. 9, "oscillations is" should read -- oscillations are --.

At column 2, line approx. 11, "conditions has" should read -- conditions have --.

At column 2, line approx. 20, "has therefore" should read -- have therefore --.

At column 2, line approx. 31-32, "which do not" should read -- which does not --.

At column 3, line approx. 3-4, "is established" should read -- are established --.

At column 3, line approx. 31-32, "are being" should read -- is being --.

At column 3, line approx. 44, "oscillations is" should read -- oscillations are --.

At column 4, line approx. 2, "are maintained" should read -- is maintained --.

At column 4, line approx. 3, "are within" should read -- is within --.

At column 4, line approx. 14, "further comprise" should read -- further comprises --.

Signed and Sealed this
Twenty-eighth Day of February, 2012

David J. Kappos
*Director of the United States Patent and Trademark Office*

At column 4, line approx. 20-21, advantageous to reducing" should read -- advantageous to reduce --.

At column 4, line approx. 33, "conditions has" should read -- conditions have --.

At column 4, line approx. 42, "fare less" should read -- far less --.

At column 4, line approx. 45, "are offset" should read -- is offset --.

At column 4, line approx. 56, "presents an" should read -- present an --.

At column 5, line approx. 21, "further comprise" should read -- further comprises --.

At column 5, line approx. 24, "oscillations has" should read -- oscillations have --.

At column 5, line approx. 28, "oscillations rises" should read -- oscillations rise --.

At column 5, line approx. 58, "wind turbine" should read -- wind turbines --.

At column 6, line approx. 27, "blades 5 comprise" should read -- blades 5 comprises --.

At column 6, line approx. 52, "oscillations has" should read -- oscillations have --.

At column 7, line approx. 5, "oscillations has" should read -- oscillations have --.

At column 7, line approx. 23, "is detected" should read -- are detected --.

At column 7, line approx. 34, "turbine 1 comprise" should read -- turbine 1 comprises --.

At column 7, line approx. 53, "illustrate the" should read -- illustrates the --.

At column 7, line approx. 63, "angle off should read -- angle of --.

At column 8, line approx. 29, "of an pitch" should read -- of a pitch --.

At column 9, line approx. 18, "between trust" should read -- between thrust --.

At column 9, line approx. 23, "wind-speed" should read -- wind speed --.

At column 10, line approx. 21, "mechanism 13 comprise" should read -- mechanism 13 comprises --.

At column 10, line approx. 32, "for the controlling" should read -- for controlling --.

CERTIFICATE OF CORRECTION (continued)
U.S. Pat. No. 7,919,880 B2

At column 10, line approx. 59, "blades are" should read -- blades is --.

At column 10, line approx. 67, "send of an" should read -- send an --.

At column 11, line 1, "oscillations continues" should read -- oscillations continue --.

In the Claims:

At column 11, claim 3, line approx. 45, "blades are being substantially" should read -- blades is substantially --.

At column 12, claim 5, line approx. 5, "are maintained" should read -- is maintained --.

At column 12, claim 7, line approx. 13, "further comprise" should read -- further comprises --.

At column 12, claim 12, line approx. 30, "further comprise" should read -- further comprises --.

At column 12, claim 12, line approx. 32, "has not" should read -- have not --.